US012578483B2

(12) United States Patent
Jayaram et al.

(10) Patent No.: US 12,578,483 B2
(45) Date of Patent: Mar. 17, 2026

(54) POSITION ESTIMATION USING STALE SATELLITE VEHICLE POSITION DATA

(71) Applicant: QUALCOMM Incorporated, San Diego, CA (US)

(72) Inventors: Chandrasekhar Jayaram, Bangalore (IN); Santoshkumar Zalake, Bengaluru (IN); Mukesh Kumar, Bangalore (IN); Srinivas Gangji, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 18/300,568

(22) Filed: Apr. 14, 2023

(65) Prior Publication Data

US 2024/0345264 A1 Oct. 17, 2024

(51) Int. Cl.
G01S 19/51 (2010.01)
G01S 5/02 (2010.01)

(52) U.S. Cl.
CPC ............. G01S 19/51 (2013.01); G01S 5/021 (2013.01)

(58) Field of Classification Search
CPC .................................. G01S 19/51; G01S 5/021
See application file for complete search history.

(56) References Cited

U.S. PATENT DOCUMENTS

| | | | | |
|---|---|---|---|---|
| 5,430,657 A * | 7/1995 | Kyrtsos | ................... | G01S 19/27 |
| | | | | 342/357.44 |
| 8,635,016 B2 * | 1/2014 | Han | ......................... | G01S 19/27 |
| | | | | 701/400 |
| 2001/0008393 A1 | 7/2001 | Valio et al. | | |
| 2004/0198449 A1 * | 10/2004 | Forrester | ................. | G01S 19/05 |
| | | | | 455/561 |

(Continued)

FOREIGN PATENT DOCUMENTS

| | | |
|---|---|---|
| WO | 0218968 A2 | 3/2002 |
| WO | 2010005778 A1 | 1/2010 |

(Continued)

OTHER PUBLICATIONS

International Search Report and Written Opinion—PCT/US2024/016843—ISA/EPO—Oct. 23, 2024.

(Continued)

*Primary Examiner* — Ariel A Balaoing
(74) *Attorney, Agent, or Firm* — QUALCOMM Incorporated

(57) ABSTRACT

A position information provision method includes: determining, at a UE, first estimated locations of a first plurality of satellite vehicles based on first satellite vehicle position information that has exceeded a first expiration time of the first satellite vehicle position information; determining, at the UE, a first position estimate based on the first estimated locations of the first plurality of satellite vehicles, and first measurements of first satellite vehicle signals received by (Continued)

the UE; and transmitting, from the UE to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate.

12 Claims, 9 Drawing Sheets

(56) References Cited

U.S. PATENT DOCUMENTS

| | | | | |
|---|---|---|---|---|
| 2006/0055598 | A1* | 3/2006 | Garin | G01S 19/258 |
| | | | | 342/357.64 |
| 2008/0100507 | A1* | 5/2008 | Syrjarinne | G01S 19/42 |
| | | | | 342/357.73 |
| 2008/0129593 | A1 | 6/2008 | Garin et al. | |
| 2008/0191936 | A1* | 8/2008 | Phatak | G01S 19/05 |
| | | | | 342/357.42 |
| 2009/0315773 | A1* | 12/2009 | Tomita | G01S 19/05 |
| | | | | 342/357.62 |
| 2009/0322605 | A1* | 12/2009 | Farmer | G01S 19/24 |
| | | | | 342/357.31 |
| 2010/0164799 | A1* | 7/2010 | Chen | G01S 19/28 |
| | | | | 342/357.43 |
| 2010/0253578 | A1 | 10/2010 | Mantovani | |
| 2014/0100778 | A1 | 4/2014 | Bagnall | |
| 2015/0378027 | A1* | 12/2015 | Shingyoji | G01S 19/34 |
| | | | | 342/357.63 |
| 2019/0227180 | A1* | 7/2019 | Toda | G01S 19/28 |
| 2022/0291394 | A1* | 9/2022 | Lee | H04W 48/12 |

FOREIGN PATENT DOCUMENTS

| | | | |
|---|---|---|---|
| WO | 2015146192 | A1 | 10/2015 |
| WO | 2017197433 | A1 | 11/2017 |
| WO | 2021178228 | A1 | 9/2021 |

OTHER PUBLICATIONS

Partial International Search Report—PCT/US2024/016843—ISA/EPO—Jul. 4, 2024.

* cited by examiner

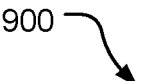

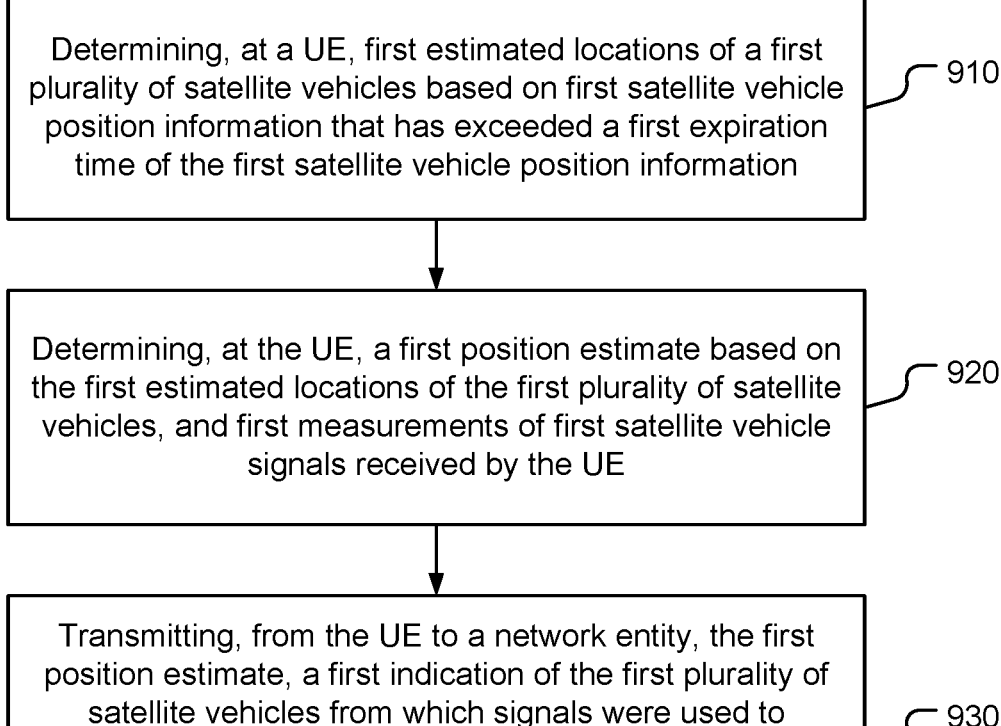

Determining, at a UE, first estimated locations of a first plurality of satellite vehicles based on first satellite vehicle position information that has exceeded a first expiration time of the first satellite vehicle position information — 910

Determining, at the UE, a first position estimate based on the first estimated locations of the first plurality of satellite vehicles, and first measurements of first satellite vehicle signals received by the UE — 920

Transmitting, from the UE to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate — 930

FIG. 9

1000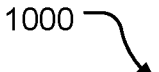

Receiving, at a network entity from a user equipment, a first reported position estimate, a first indication of first satellite vehicles from which signals were used to determine the first reported position estimate, a second indication of first stale satellite vehicle position information used to determine the first reported position estimate, and a third indication of a first time corresponding to the first reported position estimate, wherein the first stale satellite vehicle position information exceeded a first expiration time of the first stale satellite vehicle position information as of the first time corresponding to the first reported position estimate

1010

Determining, at the network entity, first pseudoranges based on the first reported position estimate, the first indication of first satellite vehicles, the second indication of the first stale satellite vehicle position information, and the third indication of the first time corresponding to the first reported position estimate

POSITION ESTIMATION USING STALE SATELLITE VEHICLE POSITION DATA

BACKGROUND

The Global Positioning System (GPS) is an example of a GNSS navigation system in which a receiver determines its position by precisely measuring the arrival time of signaling events received from multiple satellites. Each satellite transmits a navigation message containing the precise time when the message was transmitted and ephemeris information. GNSS accuracy may degrade significantly under weak signal conditions such as when the line-of-sight (LOS) to the satellite vehicles is obstructed by natural or manmade objects. Accuracy of a position determined using GNSS signals may be degraded by the limited availability of good GNSS measurements. For example, with GNSS measurements that use carrier phase to achieve higher accuracy, positioning accuracy is dependent on a constant lock. Also, accuracy may be decreased if accurate information as to the locations of satellites is unavailable. The positions of the satellites are used to determine ranges to the satellites and thus for trilateration based on the satellite positions. If the satellite positions are not well known, then the accuracy of the position of a mobile device determined using the inaccurate satellite positions may not be accurate.

SUMMARY

An example UE (user equipment) includes: one or more memories; one or more satellite positioning system receivers; one or more transmitters; and one or more processors communicatively coupled to the one or more memories, the one or more satellite positioning system receivers and the one or more transmitters, and configured to: determine first estimated locations of a first plurality of satellite vehicles based on first satellite vehicle position information that has exceeded a first expiration time of the first satellite vehicle position information; determine a first position estimate based on the first estimated locations of the first plurality of satellite vehicles, and first measurements of first satellite vehicle signals received by the one or more satellite positioning system receivers; and transmit, via the one or more transmitters to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate.

An example position information provision method includes: determining, at a UE, first estimated locations of a first plurality of satellite vehicles based on first satellite vehicle position information that has exceeded a first expiration time of the first satellite vehicle position information; determining, at the UE, a first position estimate based on the first estimated locations of the first plurality of satellite vehicles, and first measurements of first satellite vehicle signals received by the UE; and transmitting, from the UE to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate.

Another example UE includes: means for determining first estimated locations of a first plurality of satellite vehicles based on first satellite vehicle position information that has exceeded a first expiration time of the first satellite vehicle position information; means for determining a first position estimate based on the first estimated locations of the first plurality of satellite vehicles, and first measurements of first satellite vehicle signals received by the UE; and means for transmitting, to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate.

An example non-transitory, processor-readable storage medium includes processor-readable instructions to cause one or more processors of a UE to: determine first estimated locations of a first plurality of satellite vehicles based on first satellite vehicle position information that has exceeded a first expiration time of the first satellite vehicle position information; determine a first position estimate based on the first estimated locations of the first plurality of satellite vehicles, and first measurements of first satellite vehicle signals received by the UE; and transmit, to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate.

An example network entity includes: one or more memories; one or more receivers; and one or more processors communicatively coupled to the one or more memories and the one or more receivers and configured to: receive, via the one or more receivers from a user equipment, a first reported position estimate, a first indication of first satellite vehicles from which signals were used to determine the first reported position estimate, a second indication of first stale satellite vehicle position information used to determine the first reported position estimate, and a third indication of a first time corresponding to the first reported position estimate, wherein the first stale satellite vehicle position information exceeded a first expiration time of the first stale satellite vehicle position information as of the first time corresponding to the first reported position estimate; and determine first pseudoranges based on the first reported position estimate, the first indication of first satellite vehicles, the second indication of the first stale satellite vehicle position information, and the third indication of the first time corresponding to the first reported position estimate.

An example position information determination method includes: receiving, at a network entity from a user equipment, a first reported position estimate, a first indication of first satellite vehicles from which signals were used to determine the first reported position estimate, a second indication of first stale satellite vehicle position information used to determine the first reported position estimate, and a third indication of a first time corresponding to the first reported position estimate, wherein the first stale satellite vehicle position information exceeded a first expiration time of the first stale satellite vehicle position information as of the first time corresponding to the first reported position estimate; and determining, at the network entity, first pseudoranges based on the first reported position estimate, the first indication of first satellite vehicles, the second indication of the first stale satellite vehicle position information, and the third indication of the first time corresponding to the first reported position estimate.

Another example network entity includes: means for receiving, from a user equipment, a first reported position estimate, a first indication of first satellite vehicles from which signals were used to determine the first reported position estimate, a second indication of first stale satellite vehicle position information used to determine the first reported position estimate, and a third indication of a first time corresponding to the first reported position estimate, wherein the first stale satellite vehicle position information exceeded a first expiration time of the first stale satellite vehicle position information as of the first time corresponding to the first reported position estimate; and means for determining first pseudoranges based on the first reported position estimate, the first indication of first satellite vehicles, the second indication of the first stale satellite vehicle position information, and the third indication of the first time corresponding to the first reported position estimate.

Another example non-transitory, processor-readable storage medium includes processor-readable instructions to cause one or more processors of a network entity to: receive, from a user equipment, a first reported position estimate, a first indication of first satellite vehicles from which signals were used to determine the first reported position estimate, a second indication of first stale satellite vehicle position information used to determine the first reported position estimate, and a third indication of a first time corresponding to the first reported position estimate, wherein the first stale satellite vehicle position information exceeded a first expiration time of the first stale satellite vehicle position information as of the first time corresponding to the first reported position estimate; and determine first pseudoranges based on the first reported position estimate, the first indication of first satellite vehicles, the second indication of the first stale satellite vehicle position information, and the third indication of the first time corresponding to the first reported position estimate.

BRIEF DESCRIPTION OF THE DRAWINGS

FIG. 9 is a block flow diagram of a position information provision method.

FIG. 10 is a block flow diagram of a position information determination method.

DETAILED DESCRIPTION

Figure 1:
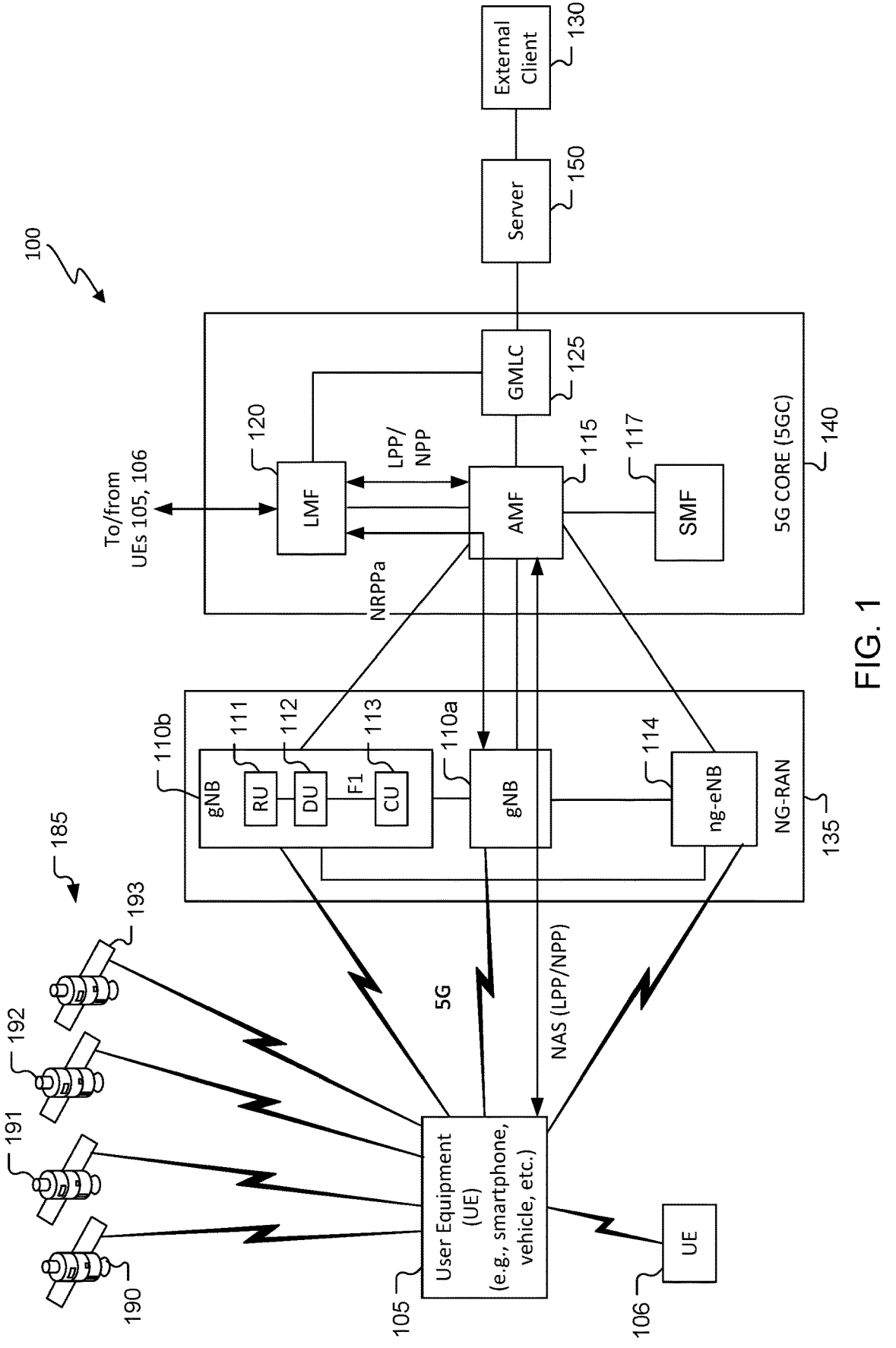
FIG. 1 is a simplified diagram of an example wireless communications system.

Techniques are discussed herein for determining position estimates for mobile devices using stale satellite position information. For example, a mobile device may use outdated and/or incomplete satellite position information to estimate locations of satellites, determine pseudoranges to the satellites based on measurements of positioning signals from the satellites, and determine a position estimate based on the satellite location estimates and the pseudoranges. The mobile device may provide a server with the position estimate, a time corresponding to the position estimate, and the satellites from which positioning signal measurements were used to determine the position estimate. The server may use this information to determine reconstructed pseudoranges to the satellites, and may use the reconstructed pseudoranges, the time, and satellite location information that was valid at the time, to determine an updated position estimate for the mobile device. Also or alternatively, the mobile device may provide an indication of position estimate and an indication of incomplete satellite information from which the position estimate was determined, and a server with more satellite information may determine a position estimate for the mobile device using the more complete satellite information. For example, the mobile device may not have satellite location information for one or more satellites for which the mobile device measures one or more corresponding signals, and/or may have less than precise satellite location(s) due to incomplete satellite positioning information. The server may use the signal measurements in conjunction with satellite location information unavailable to the mobile device to determine a revised position estimate, which may be more accurate than the position estimate determined by the mobile device. Other configurations, however, may be used.

Items and/or techniques described herein may provide one or more of the following capabilities, as well as other capabilities not mentioned. Accurate position estimates for a mobile device may be obtained despite the mobile device having outdated satellite location information. How often a mobile device obtains updated satellite location information (and thus power consumption to obtain satellite location information) may be reduced. Absent network (e.g., wireless wide area network) coverage of a mobile device, a position estimate may be determined using stale satellite vehicle information, stored (e.g., cached), and opportunistically uploaded to a server when network coverage is available. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, on-board unit (OBU), etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," "a wireless node," a "subscriber device," a "subscriber terminal," a "subscriber station," a "user terminal" or UT, a "mobile terminal," a "mobile station," a "mobile device," or variations thereof. A UE disposed in a vehicle may be called an on-board unit (OBU). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110*a*, 110*b* and/or the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMAX®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/ system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi® APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the UE's position.

Figure 2:
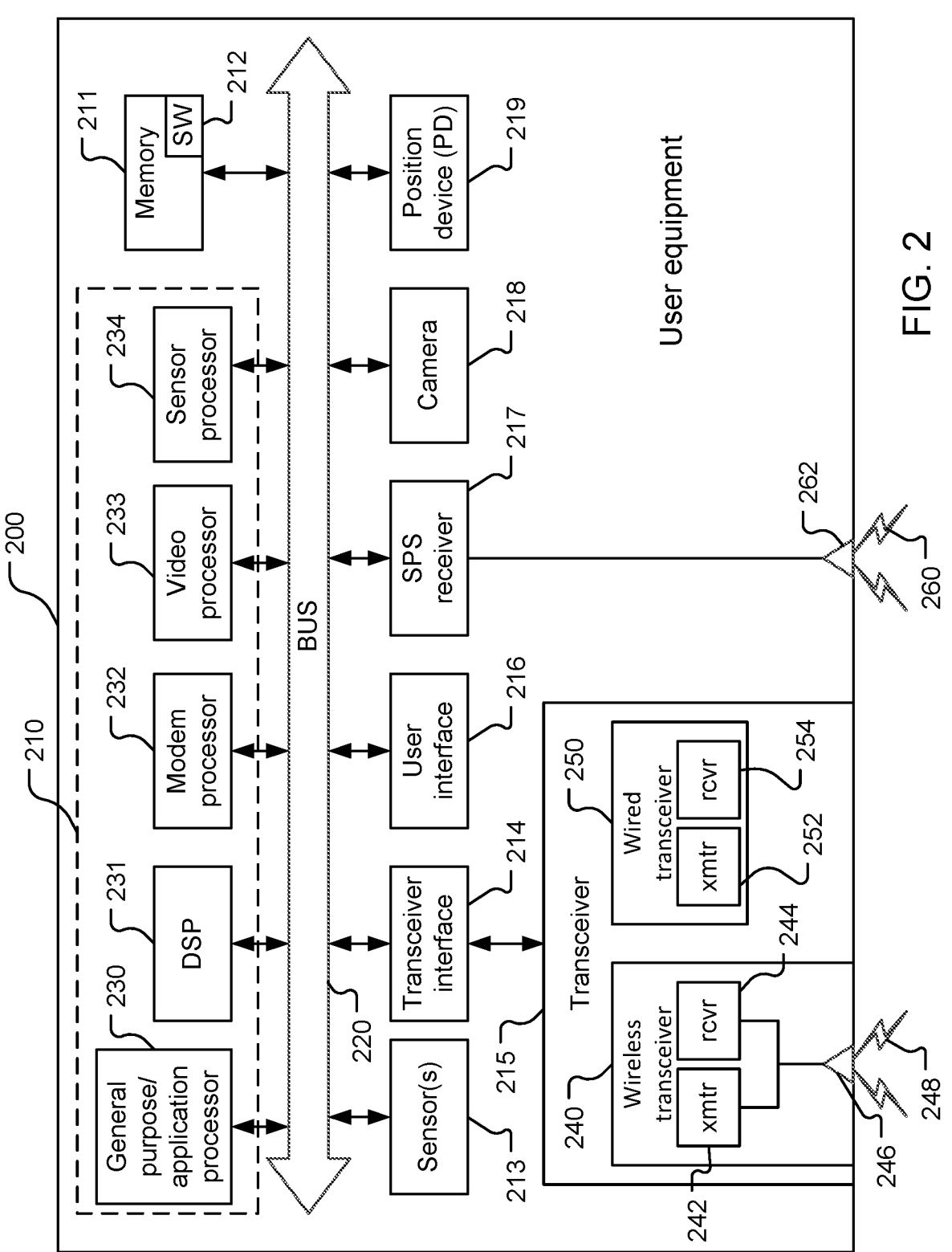
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), UltraWide-Band (UWB), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
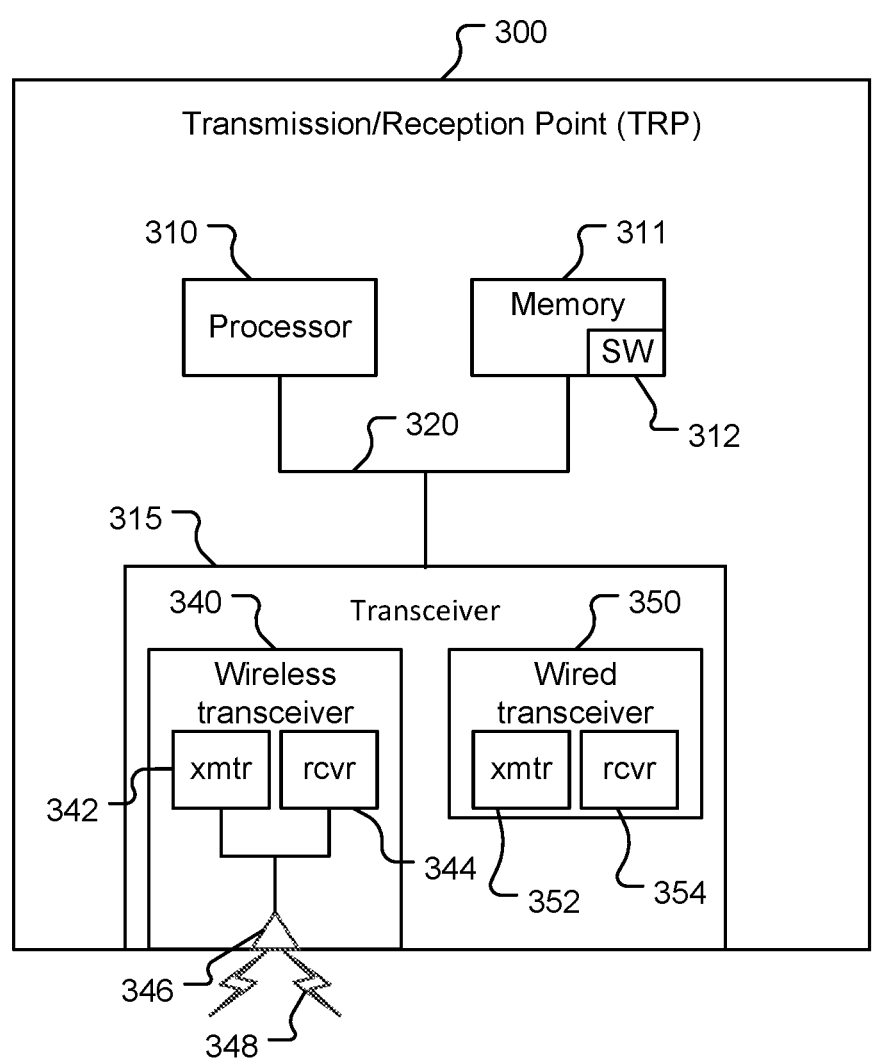
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), UWB, Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions). In an example, a RSU may include some or all of the components of a TRP 300. The TRP 300 may be an example of a wireless node in a communications network.

Figure 4:
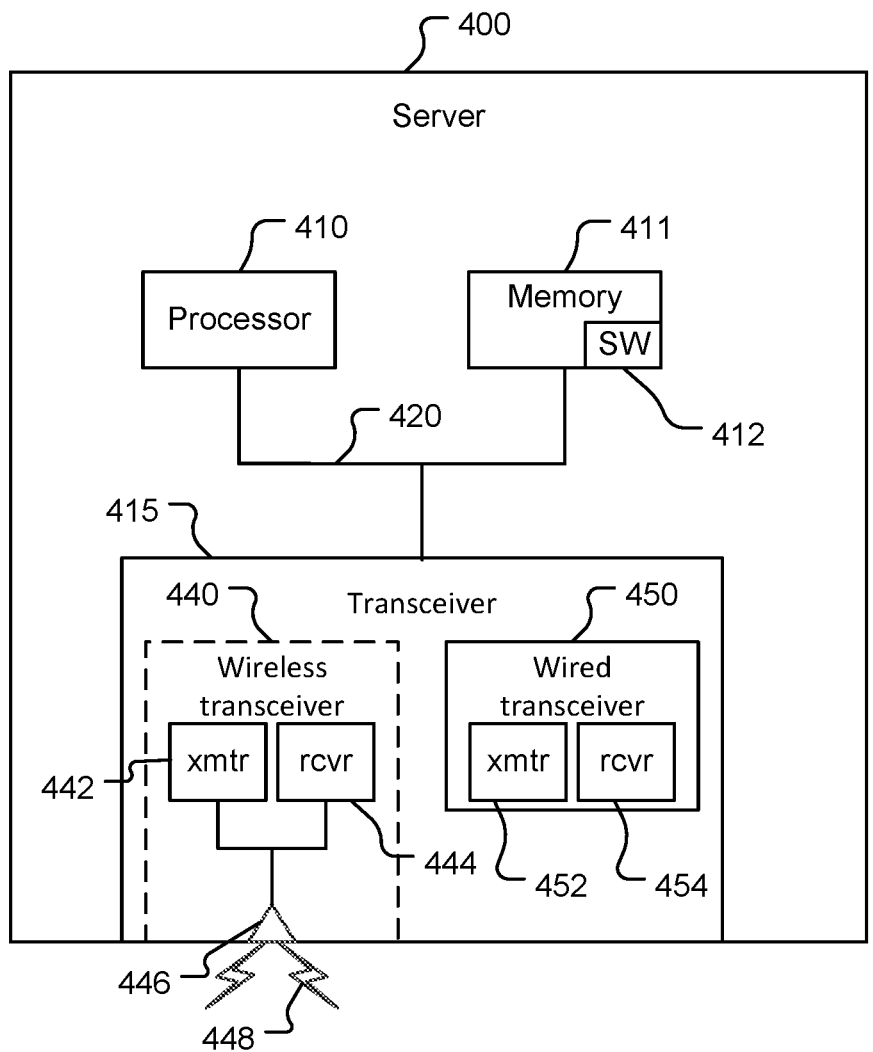
FIG. 4 is a block diagram of components of a server.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), UWB, Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Figure 5:
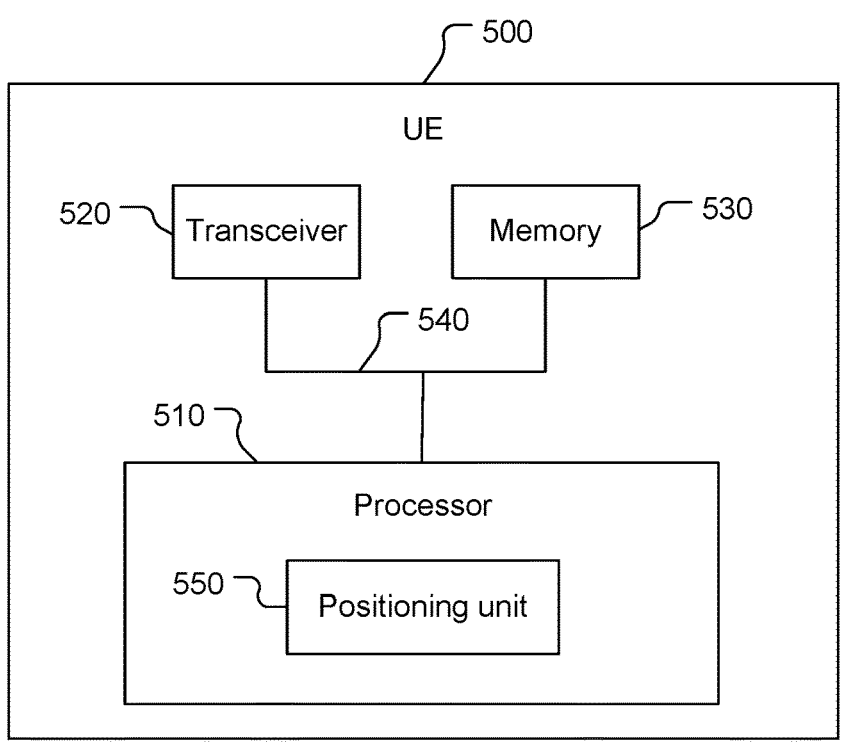
FIG. 5 is a block diagram of an user equipment.

Referring also to FIG. 5, a UE 500 includes a processor 510, a transceiver 520, and a memory 530 communicatively coupled to each other by a bus 540. The UE 500 may include the components shown in FIG. 5. The UE 500 may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions. Even if referred to in the singular, the processor 510 may include one or more processors, the transceiver 520 may include one or more transceivers (e.g., one or more transmitters and/or one or more receivers), and the memory 530 may include one or more memories.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a positioning unit 550. The positioning unit 550 may be configured to perform positioning operations (e.g., determine position information (e.g., measurements, pseudoranges, position estimates, etc.). The positioning unit 550 is discussed further below, and the description may refer to the processor 510 generally, or the UE 500 generally, as performing any of the functions of the positioning unit 550, with the UE 500 being configured to perform the function(s).

Figure 6:
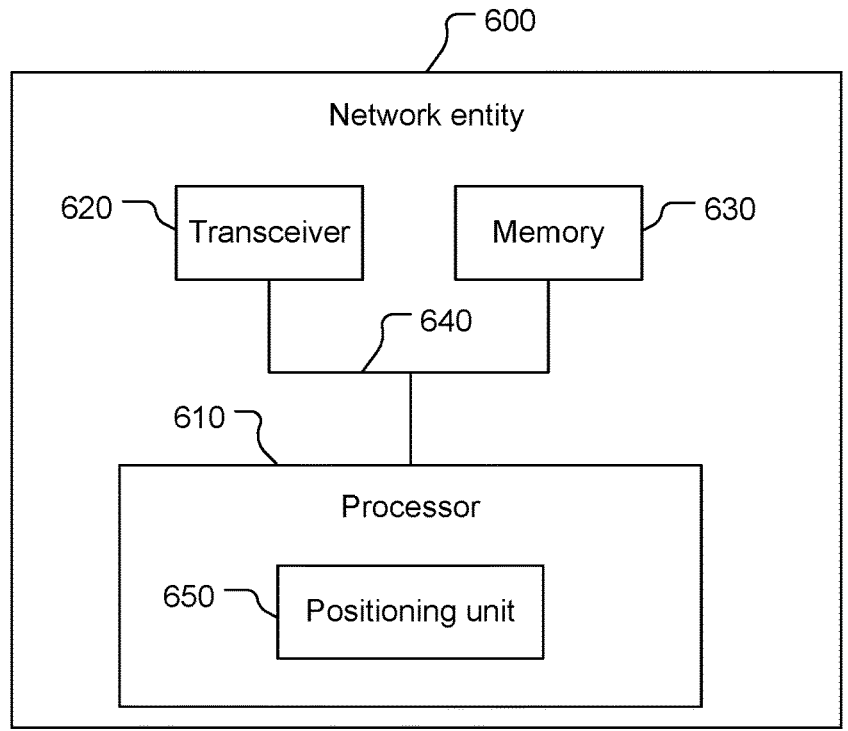
FIG. 6 is a block diagram of an example network entity.

Referring also to FIG. 6, a network entity 600 includes a processor 610, a transceiver 620, and a memory 630 communicatively coupled to each other by a bus 640. The network entity 600 may include the components shown in FIG. 6 and may be configured to be a component of a communication network (e.g., a terrestrial communication network such as a cellular network). The network entity 600 may include one or more other components such as any of those shown in FIG. 4 such that the server 400 may be an example of the network entity 600. For example, the processor 610 may include one or more of the components of the processor 410. The transceiver 620 may include one or more of the components of the transceiver 415. The memory 630 may be configured similarly to the memory 411, e.g., including software with processor-readable instructions configured to cause the processor 610 to perform functions. Also or alternatively, the network entity 600 may include one or more other components such as any of those shown in FIG. 3 such that the TRP 300 may be an example of the network entity 600. For example, the processor 610 may include one or more of the components of the processor 310. The transceiver 620 may include one or more of the components of the transceiver 315. The memory 630 may be configured similarly to the memory 311, e.g., including software with processor-readable instructions configured to cause the processor 610 to perform functions. Even if referred to in the singular, the processor 610 may include one or more processors, the transceiver 620 may include one or more transceivers (e.g., one or more transmitters and/or one or more receivers), and the memory 630 may include one or more memories.

The description herein may refer to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the transceiver 620) may include a positioning unit 650. The positioning unit 650 is discussed further below, and the description may refer to the processor 610 generally, or the network entity 600 generally, as performing any of the functions of the positioning unit 650, with the network entity 600 being configured to perform the function(s).

Some devices, including some UEs, such as IoT devices may receive satellite positioning information (e.g., ephemeris data, XTRA (Extended Receiver Assistance) data) providing information regarding positions of satellite vehicles (SVs) (e.g., orbital parameters). The XTRA data may include future orbital information (e.g., based on a coarse model and using numerical integration to predict the future orbital information). Factors such as the bulge factor may affect SV orbits and entities such NASA (National Aeronautics and Space Administration) and JPL (Jet Propulsion Laboratory) model the orbits and provide precise orbital information. The XTRA data includes orbital data in a compressed format and may be downloaded from a terrestrial server to a UE through a terrestrial network.

Satellite positioning information may be deemed to be stale (undesirable for consumption/use) for one or more reasons. For example, satellite positioning information may be deemed to be stale if only partial satellite positioning information is available. For example, a device may have satellite positioning information for less than a full constellation, or satellite positioning information for fewer than all SPS constellations, or insufficient satellite positioning information (e.g., antenna phase offset, antenna center variation, etc.) to determine the location of each SV with desired accuracy). As another example, satellite positioning information may be deemed stale due to being outdated.

Devices such as IoT devices or other UEs may receive satellite positioning information less often than the satellite positioning information expires. For example, satellite positioning information may have a limited validity time. If an expiration time passes (e.g., a specific day/month/year, or an elapsed time since reception, etc.), then the satellite position information may be deemed stale, with accuracy of the information being compromised or even unusable for determining a position of a mobile device. For example, ephemeris data may be valid for between 15 minutes and two hours and XTRA data may be valid for between two (2) and seven (7) days, and after expiration may not, for example, be able to be used to provide below a threshold level of positioning accuracy. Ephemeris data typically takes about 30 seconds to decode, absent errors and with LOS between UE and SV, due to a low data rate (e.g., about 50 bps to about 250 bps). If errors are encountered, then decoding the ephemeris data will take a multiple of 30 seconds to decode accurately, consuming significant power. The XTRA data may be provided at a faster rate than ephemeris data due to the XTRA data being provided through a terrestrial network. Devices such as IoT devices may be camped on an LPWAN (Low Power Wide Area Network) and not support higher-data rates for downloading XTRA/ephemeris data for SPS positioning. Further, positioning accuracy may not be stringent. Consequently, satellite positioning information may not be updated regularly ((e.g., being updated sporadically or even based on occurrence of an event). Downloading XTRA data may not be a feasible approach for event-based or sporadic position reporting and downloading ephemeris data for every location session may not be efficient. Satellite positioning signal measurements may thus correspond to stale satellite positioning information, which may result in less-than-desired position estimate accuracy for a UE.

Figure 7:
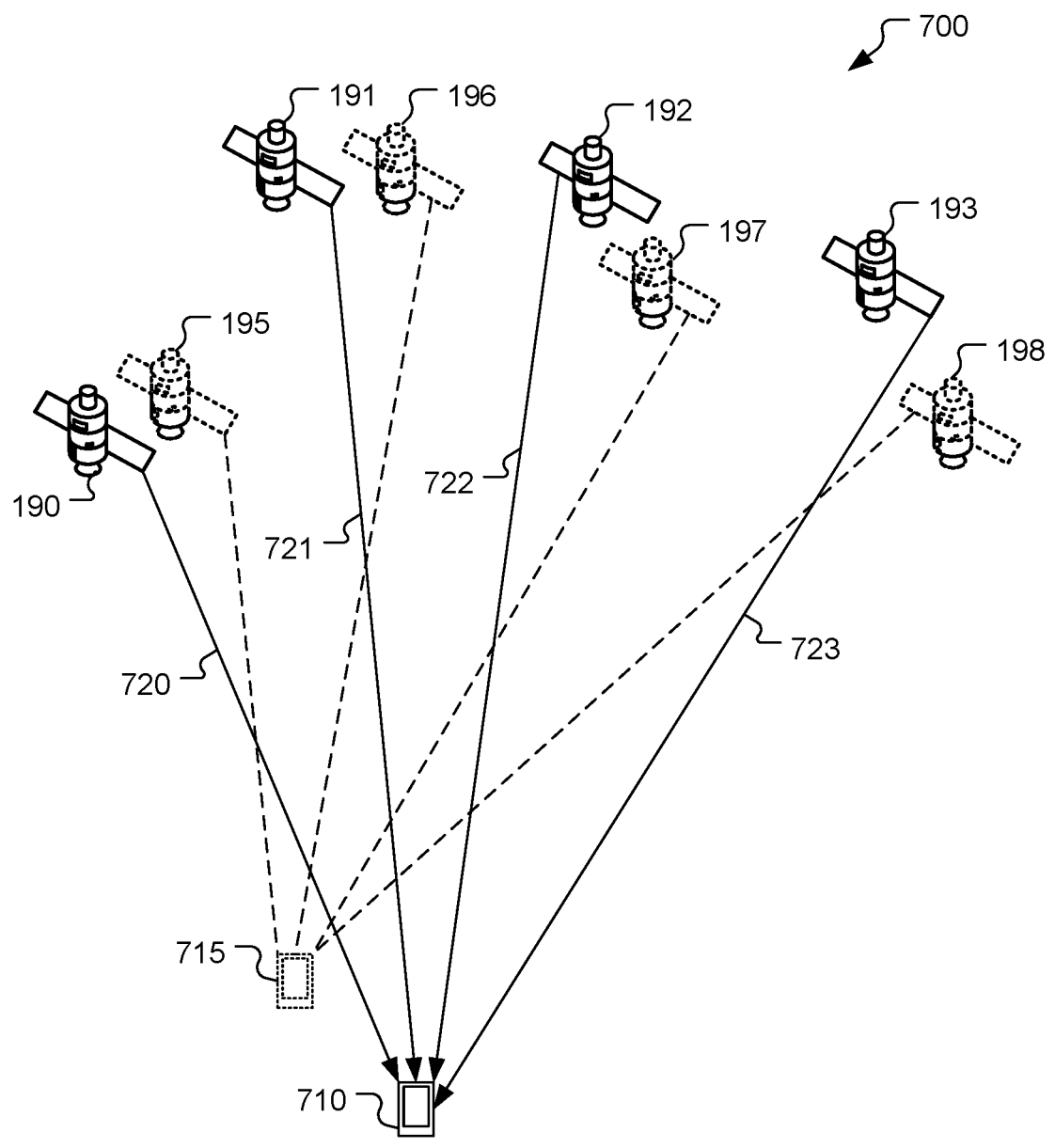
FIG. 7 is a schematic diagram of a positioning environment including the user equipment shown in FIG. 5.

Referring also to FIG. 7, a positioning environment 700 includes a UE 710 and the SVs 190-193. The UE 710 may receive positioning signals 720, 721, 722, 723 from the SVs 190-193, respectively. The UE 710 may use measurements of the positioning signals 720-723 to determine pseudoranges between the UE 710 and the SVs 190-193 and use the pseudoranges and information regarding SV locations to determine a position estimate for the UE 710. If, however, the satellite positioning information is stale, then then SV locations used by the UE 710 may be inaccurate. For example, the UE 710 may believe that the SVs 190-193 are at locations shown by phantom SVs 195, 196, 197, 198, and thus determine a position estimate corresponding to a phantom UE 715 instead of determining an accurate position estimate of the UE 710.

Figure 8:
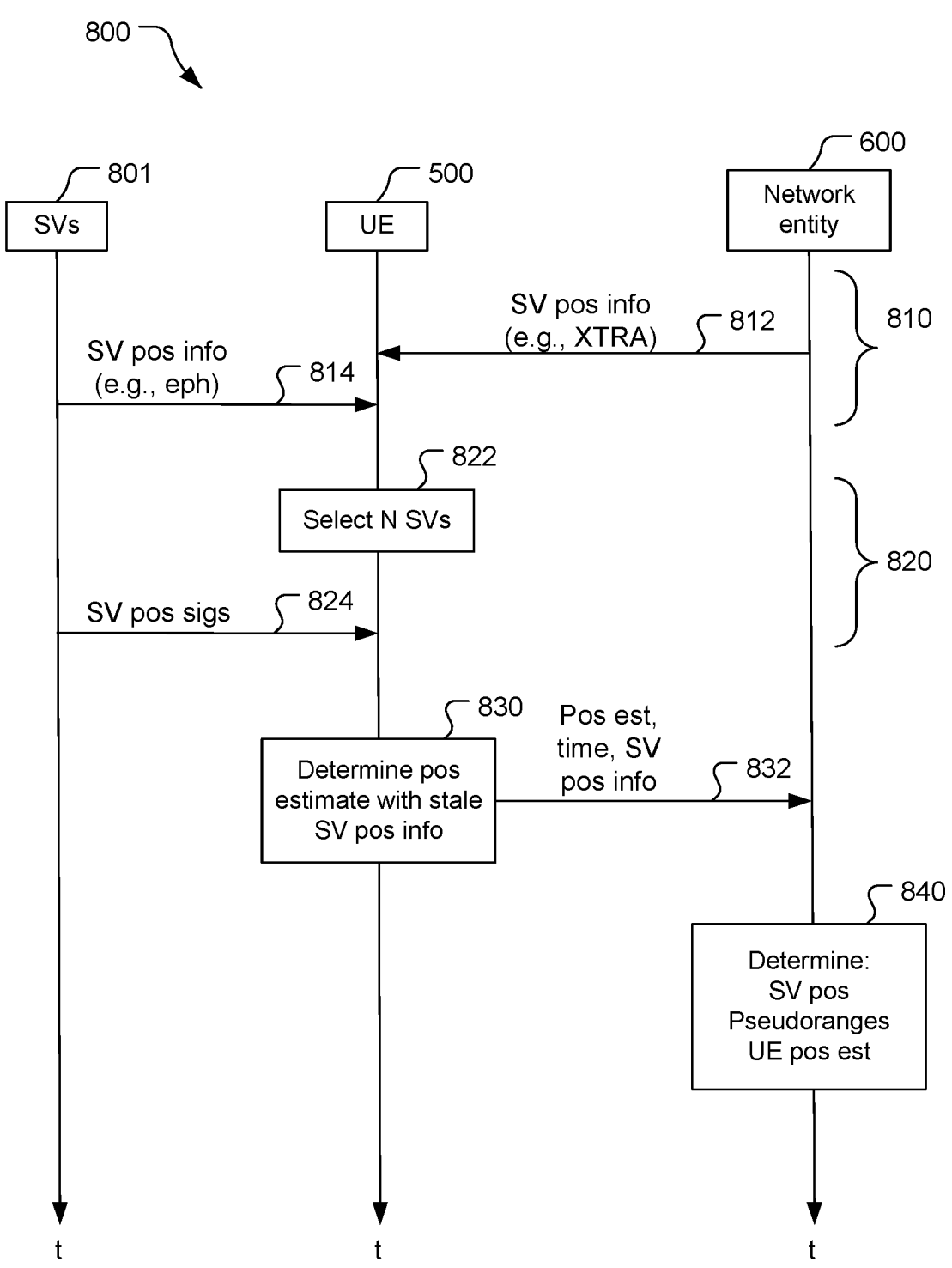
FIG. 8 is a processing and signal flow diagram of determining a position estimate of the UE shown in FIG. 5 using stale satellite position information.

Referring also to FIG. 8, a signal and processing flow 800 for determining a position estimate for the UE 500 based on stale SV position information includes stages shown. The flow 800 is an example flow and not limiting. The flow 800 may be altered, e.g., by having one or more messages and/or one or more stages added, removed, rearranged, combined, performed concurrently, and/or having one or more messages and/or one or more stages split into multiple messages and/or stages. The flow 800 may be used, for example, to determine a position estimate of the UE 500 without the UE 500 (e.g., an LPWAN IoT device) having up-to-date SV position information (e.g., ephemeris and/or XTRA).

At stage 810, the UE 500 obtains SV position information. For example, the UE 500 may receive an SV position information message 812 from the network entity 600 containing SV position information such as XTRA data with orbital information. As another example, the UE 500 may receive one or more SV position information messages 814 from one or more SVs 801 containing SV position information such as ephemeris data. The SV position information in the messages 812, 814 may include respective indications of expiration times of the respective SV position information. The UE 500 may opportunistically obtain (e.g., when a network connection is available) the SV position information, and thus conserve energy (e.g., battery power) obtaining the SV position information. For example, the same SV position information (e.g., almanac data) may be used for days or even weeks. The UE 500 may operate in a low-power mode and may directly transition to a duty-cycle tracking mode. The UE 500 may store the SV position information in the memory 530 even after an expiration time associated with the SV position information. For example, the UE 500 may store the SV position information in the memory 530 until the UE 500 obtains more current SV position information, e.g., removing the stale SV position information from the memory 530 (e.g., overwriting the stale SV position information) only in response to receiving updated SV position information, e.g., from the network entity 600 via the transceiver (e.g., a communication receiver of the transceiver 520).

At stage 820, the UE 500 may acquire and track the SVs 801. For example, the UE 500 may use visibility and acquisition assistance information contained in either or both of the messages 812, 814 to acquire and track the SVs 801 using SV positioning signals 824 transmitted by the SVs 801. At sub-stage 822, the UE 500, e.g., the positioning unit 550, selects N SVs with acceptable geometry (e.g., based on LOS vectors between the UE 500 and the SVs 801). The value of N may vary based on desired information. For example, the value of N may be four (4) in order to determine a location of the UE 500 and time. As another example, the value of N may be five (5) where the UE 500 has a coarse time, and the UE 500 desires to determine a fine time. If SVs from multiple constellations are to be used by the UE 500, then the value of N may be increased. The UE 500 may receive SV positioning signals 824 from the N selected SVs 801.

At some point in time, either before or after acquisition of the SVs 801, the SV position information used by the UE 500 to acquire and track the SVs 801 expires and thus becomes stale. An expiration time of SV position information may, for example, be a time after which an accuracy of the SV locations is below a threshold accuracy (e.g., the SV locations may be greater than a threshold error (e.g., 1 m, 2 m, 5 m, etc.) away from indicated locations). Also or alternatively, the position information 812, 814 may be stale due to being incomplete.

At stage 830, the UE 500, e.g., the positioning unit 550, may use the stale SV position information (e.g., coarse SV location, coarse time, incomplete satellite information) to acquire and/or track the SVs 801 using the SV positioning signals 824. The UE 500 may measure the SV positioning signals 824 and may determine pseudoranges (PRs) and pseudorange residuals (PRRs) from SV positioning signal measurements. The positioning unit 550 may extrapolate the SV locations from outdated stale SV position information to the receiver time corresponding to SV positioning signal measurements. The positioning unit 550 may use the measured PR/PRR and SV locations extrapolated from the stale SV position information to determine a position estimate for the UE 500. Because the extrapolated SV locations from the stale SV position information may be inaccurate, the determined position estimate for the UE 500 may be inaccurate. Also or alternatively, the determine position estimate may be less accurate than possible due to incomplete stale SV position information. For example, one or more SV locations may be less than precisely determined due to incomplete information (e.g., incomplete antenna phase offset, incomplete antenna center variation). As another example, one or more SV locations may be unknown due to lack of information (e.g., not full constellation information, lack of SV location information for a constellation, etc.) about one or more SVs from which one or more signals are measured. The UE 500 may put positioning information into a set of packed (e.g., compressed) information for transfer to the network entity 600. For example, the UE 500 may pack a UE state (e.g., the position estimate), an indication of the N SVs 801 used to determine the position estimate, an indication of SV position information (e.g., almanac, ephemeris, XTRA) used to determine the position estimate, and the receiver time (i.e., time according to the UE 500) used to determine the position estimate into a packed format. The indication of the SV position information may include an indication of the stale SV position information, e.g., an ephemeris identifier such as ephemeris week number/ToE (Time of Ephemeris), an XTRA identifier such as XTRA CRC (Cyclic Redundancy Check)/header, and/or an almanac identifier such as almanac week number/ToA (Time of Almanac). The UE 500 may also pack one or more signal measurements for satellites for which location information is unknown to the UE 500. The UE 500 may transmit the packed position information in a position information message 832, e.g., including indications of the position estimate, the receiver time, and the SV positioning information (including selected SVs from which positioning signals were used to determine the position estimate).

At stage 840, the network entity 600, e.g., the positioning unit 650, receives the position information in the position information message 832 and determines a revised position estimate for the UE 500 that may be (almost certainly will be) a more accurate position estimate than the position estimate determined by the UE 500. The positioning unit 650 may use the indications of receiver time and SV position information to extrapolate the SV locations from the stale SV position information to the receiver time. The positioning unit 650 may use the extrapolated SV locations to reconstruct pseudoranges between the UE 500 and the extrapolated SV locations. The pseudoranges may be more accurately reconstructed if the reported position estimate was based on N measurements from the N SVs 801 (i.e., without any redundant measurements). To determine the reconstructed pseudoranges, the positioning unit 650 may use the position estimate reported by the UE 500 and the extrapolated SV locations to determine reconstructed pseudoranges. The positioning unit 650 may determine accurate SV locations corresponding to the reported receiver time corresponding to the reported position estimate by using valid, non-stale SV position information (e.g., ephemeris, XTRA) corresponding to the reported receiver time (corresponding to the reported position estimate). The positioning unit 650 may use the accurate SV locations and the reconstructed pseudoranges to determine a revised position estimate for the UE 500. Also or alternatively, the positioning unit 650 may use the measurement(s) from the SV(s) for which the UE 500 did not have SV location information to determine pseudoranges. The positioning unit 650 may use these pseudoranges and known location information for the SV(s) to determine (in isolation or in conjunction with the reconstructed pseudoranges and corresponding SV locations) a revised position estimate for the UE 500. The revised position estimate may be more accurate than the reported position estimate (determined and reported by the UE 500) due to the more accurate SV locations, and/or more SV locations and corresponding pseudoranges, used to determine the revised position estimate than used to determine the reported position estimate.

The flow 800 may be modified to provide batch reporting of position estimates by the UE 500 and using batched reported position estimates by the network entity 600 to determine the revised position estimate of the UE 500. For example, the UE 500 may store the set of packed information based on one set of N SVs and then repeat the process of determining a position estimate using another set of M SVs (where M may be equal to N or may be unequal to N), determine a new set of packed information, and append the new set of packed information to the previous set of packed information. The UE 500 may repeat this process for multiple sets of SVs (with different sets possibly containing the same quantities of SVs or possibly containing different quantities of SVs) and send the multiple sets of packed information in a batch report to the network entity 600. For example, the UE 500 may wait until network connectivity is present to transmit the batch report opportunistically to the network entity 600, which may help conserve power at the UE 500. The network entity 600 may use the multiple sets of packed information to determine the revised position estimate. For example, the network entity 600 may determine a revised position estimate for each set of packed information received in the batch reporting and then combine (e.g., average) the multiple revised position estimates to determine a final revised position estimate.

Referring to FIG. 9, with further reference to FIGS. 1-8, a position information provision method 900 includes the stages shown. The method 900 is, however, an example only and not limiting. The method 900 may be altered, e.g., by having one or more stages added, removed, rearranged, combined, performed concurrently, and/or by having one or more single stages split into multiple stages.

At stage 910, the method 900 includes determining, at a UE, first estimated locations of a first plurality of satellite vehicles based on first satellite vehicle position information that has exceeded a first expiration time of the first satellite vehicle position information. For example, at stage 830 the UE 500 may extrapolate stale SV position information (e.g., extrapolating SV locations from an expiration time of the SV position information along SV trajectories) to a present UE time (receiver time) to determine SV locations of N SVs corresponding to the present UE time. As another example, the UE 500 may estimate the SV locations based on an expected drift rate of the SV locations, the expiration time, and the present UE time. The processor 510, possibly in combination with the memory 530, may comprise means for determining the first estimated locations of the first plurality of satellite vehicles.

At stage 920, the method 900 includes determining, at the UE, a first position estimate based on the first estimated locations of the first plurality of satellite vehicles, and first measurements of first satellite vehicle signals received by the UE. For example, the positioning unit 550 of the UE 500 may determine, at stage 830, a position estimate of the UE

500 based on the extrapolated SV locations and pseudoranges determined from measurements of the SV positioning signals 824. The processor 510, possibly in combination with the memory 530, in combination with the transceiver 520 (e.g., the wireless receiver 244 and the antenna 246) may comprise means for determining the first position estimate.

At stage 930, the method 900 includes transmitting, from the UE to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate. For example, the positioning unit 550 of the UE 500 may transmit, at stage 830, the position information message 832 including an indication of the N SVs (e.g., a list of SVs and/or a list of SV signals) from which the SV positioning signals 824 were received and measured. The position information message 832 may include an indication stale SV position information, and an indication of the UE time (clock time of the UE 500) corresponding to the position estimate (e.g., corresponding to the time(s) of measurement of the SV positioning signals 824). The processor 510, possibly in combination with the memory 530, in combination with the transceiver 520 (e.g., the wireless transmitter 242 and the antenna 246) may comprise means for transmitting the first position estimate, the first indication, the second indication, and the third indication.

Implementations of the method 900 may include one or more of the following features. In an example implementation, the method 900 includes extrapolating, at the UE, satellite vehicle paths indicated by the first satellite vehicle position information to determine the first estimated locations of the first plurality of satellite vehicles. For example, at stage 830 the UE 500 may extrapolate stale SV position information (e.g., extrapolating SV locations from an expiration time of the SV position information along SV trajectories) to a present UE time (receiver time) to determine SV locations of N SVs corresponding to the present UE time. The processor 510, possibly in combination with the memory 530, in combination with the transceiver 520 (e.g., the wireless receiver 244 and the antenna 246) may comprise means for extrapolating the SV signal paths. In another example implementation, the method 900 includes receiving updated satellite vehicle position information at the UE from the network entity, wherein the first satellite vehicle position information is stale satellite vehicle position information; and removing the stale satellite vehicle position information from a memory of the UE only in response to receiving the updated satellite vehicle position information from the network entity. For example, the processor 510 may only remove SV position information, even if stale, from the memory 530 if updated SV position information is received. The processor 510, possibly in combination with the memory 530, in combination with the transceiver 520 (e.g., the wireless receiver 244 and the antenna 246) may comprise means for receiving the updated satellite vehicle position information. The processor 510, in combination with the memory 530, may comprise means for removing the stale satellite position information from the memory. In another example implementation, a batch report includes the first position estimate, the first indication, the second indication, and the third indication, and the position information provision method 900 further includes: determining, at the UE, second estimated locations of a second plurality of satellite vehicles, different from the first plurality of satellite vehicles, based on second satellite vehicle position information that has exceeded a second expiration time of the second satellite vehicle position information; determining, at the UE, a second position estimate based on the second estimated locations of the second plurality of satellite vehicles, and second measurements of second satellite vehicle signals received by the UE; and transmitting, from the UE to the network entity in the batch report, the second position estimate, a fourth indication of the second plurality of satellite vehicles from which signals were used to determine the second position estimate, a fifth indication of the second satellite vehicle position information used to determine the second position estimate, and a sixth indication of a second time corresponding to the second position estimate. For example, the positioning unit 550 may determine multiple position estimates based on multiple sets of SVs and may transmit a batch report that includes the first, second, and third indications, and also includes an of the set of SVs (e.g., a list of SVs and/or a list of SV signals) from which the SV positioning signals 824 were received and measured to determine the second position estimate. The batch report may include an indication stale SV position information, and an indication of the UE time (clock time of the UE 500) corresponding to the second position estimate (e.g., corresponding to the time(s) of measurement of the SV positioning signals 824 used to determine the second position estimate). The fifth indication of the second satellite vehicle position information may be the second indication of the first satellite vehicle position information. The first time and the second time may be identical. The processor 510, possibly in combination with the memory 530, may comprise means for determining the second estimated locations of the second plurality of satellite vehicles. The processor 510, possibly in combination with the memory 530, in combination with the transceiver 520 (e.g., the wireless receiver 244 and the antenna 246) may comprise means for determining the second position estimate. The processor 510, possibly in combination with the memory 530, in combination with the transceiver 520 (e.g., the wireless transmitter 242 and the antenna 246) may comprise means for transmitting the second position estimate, the fourth indication, the fifth indication, and the sixth indication.

Referring to FIG. 10, with further reference to FIGS. 1-8, a positioning information determination method 1000 includes the stages shown. The method 1000 is, however, an example only and not limiting. The method 1000 may be altered, e.g., by having one or more stages added, removed, rearranged, combined, performed concurrently, and/or by having one or more single stages split into multiple stages.

At stage 1010, the method 1000 includes receiving, at a network entity from a user equipment, a first reported position estimate, a first indication of first satellite vehicles from which signals were used to determine the first reported position estimate, a second indication of first stale satellite vehicle position information used to determine the first reported position estimate, and a third indication of a first time corresponding to the first reported position estimate, wherein the first stale satellite vehicle position information exceeded a first expiration time of the first stale satellite vehicle position information as of the first time corresponding to the first reported position estimate. For example, at stage 830 the network entity 600 may receive the position information message 832 including an indication of the N SVs (e.g., a list of SVs and/or a list of SV signals) from which the SV positioning signals 824 were received and measured by the UE 500. The position information message

832 may include an indication stale SV position information, and an indication of the UE time (clock time of the UE 500) corresponding to the position estimate (e.g., corresponding to the time(s) of measurement of the SV positioning signals 824). The processor 610, possibly in combination with the memory 630, possibly in combination with the transceiver 620 (e.g., the wireless receiver 344 and the antenna 346, or the wireless receiver 444 and the antenna 446, and/or the wired receiver 454) may comprise means for receiving the first reported position estimate, the first indication, the second indication, and the third indication.

At stage 1020, the method 1000 includes determining, at the network entity, first pseudoranges based on the first reported position estimate, the first indication of first satellite vehicles, the second indication of the first stale satellite vehicle position information, and the third indication of the first time corresponding to the first reported position estimate. For example, at stage 840 the positioning unit 650 determines pseudoranges to the N SVs, indicated by the UE 500, using the reported UE position estimate, the UE time corresponding to the reported UE position estimate, and the stale SV position information. The positioning unit 650 may extrapolate the stale SV position information for the identified SVs to the indicated time to determine extrapolated SV locations, and use these locations and the reported UE position to determine the pseudoranges. The processor 610, possibly in combination with the memory 630, may comprise means for determining the first pseudoranges.

Implementations of the method 1000 may include one or more of the following features. In an example implementation, the method 1000 includes determining, at the network entity, an updated position estimate for the user equipment based on the first pseudoranges and first fresh satellite vehicle position information corresponding to the first satellite vehicles indicated by the first indication, wherein a second expiration time of the fresh satellite vehicle position information is no earlier than the first time corresponding to the first reported position estimate. The positioning unit 650 may analyze valid (unexpired) SV position information corresponding to the UE time corresponding to the reported UE position estimate to determine accurate SV locations corresponding to the UE time corresponding to the reported UE position estimate. The positioning unit 650 may use these accurate SV locations and the first pseudoranges to determine the updated position estimate for the UE. The processor 610, possibly in combination with the memory 630, may comprise means for determining the updated position estimate. In another example implementation, the method 1000 includes: receiving, at the network entity from the user equipment, a second reported position estimate, a fourth indication of second satellite vehicles from which signals were used to determine the second reported position estimate, a fifth indication of second stale satellite vehicle position information used to determine the second reported position estimate, and a sixth indication of a second time corresponding to the second reported position estimate, wherein the second stale satellite vehicle position information exceeded a second expiration time of the second stale satellite vehicle position information as of the second time corresponding to the second reported position estimate; determining, at the network entity, second pseudoranges based on the first reported position estimate, the fourth indication of second satellite vehicles, the fifth indication of the second stale satellite vehicle position information, and the sixth indication of the second time corresponding to the second reported position estimate; and determining, at the network entity, an updated position estimate for the user equipment based on the first pseudoranges, the second pseudoranges, and fresh satellite vehicle position information corresponding to the first satellite vehicles indicated by the first indication and the second satellite vehicles indicated by the fourth indication, wherein a third expiration time of the fresh satellite vehicle position information is no earlier than the first time corresponding to the first reported position estimate or the second time corresponding to the second reported position estimate. For example, the positioning unit 650 may receive a batch report with multiple position estimates and corresponding indications multiple sets of SVs, multiple UE times, and the same or different stale SV position information, and determine pseudoranges between the UE 500 and the sets of SVs based on the multiple position estimates, and the corresponding stale SV position information and UE times (which may be identical). The positioning unit 650 may use the pseudoranges and fresh SV position information to determine an updated position estimate for the UE 500, e.g., by determining multiple position estimates, each corresponding to a set of SVs, using fresh SV position information, and combining the multiple position estimates (e.g., by averaging) to determine the updated position estimate. The processor 610, possibly in combination with the memory 630, possibly in combination with the transceiver 620 (e.g., the wireless receiver 344 and the antenna 346, or the wireless receiver 444 and the antenna 446, and/or the wired receiver 454) may comprise means for receiving the second reported position estimate, the fourth indication, the fifth indication, and the sixth indication. The processor 610, possibly in combination with the memory 630, may comprise means for determining the second pseudoranges and means for determining the updated position estimate.

Implementation Examples

Implementation examples are provided in the following numbered clauses.

Clause 1. A UE comprising:

one or more memories;

one or more satellite positioning system receivers;

one or more transmitters; and one or more processors communicatively coupled to the one or more memories, the one or more satellite positioning system receivers, and the one or more transmitters, and configured to:

determine first estimated locations of a first plurality of satellite vehicles based on first satellite vehicle position information that has exceeded a first expiration time of the first satellite vehicle position information;

determine a first position estimate based on the first estimated locations of the first plurality of satellite vehicles, and first measurements of first satellite vehicle signals received by the one or more satellite positioning system receivers; and transmit, via the one or more transmitters to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate.

Clause 2. The UE of clause 1, wherein the one or more processors are configured to extrapolate satellite vehicle paths indicated by the first satellite vehicle position information to determine the first estimated locations of the first plurality of satellite vehicles.

Clause 3. The UE of clause 1, further comprising one or more communication receivers communicatively coupled to the one or more processors and configured to receive signals from the network entity, wherein the first satellite vehicle position information is stale satellite vehicle position information, and wherein the one or more processors are configured to remove the stale satellite vehicle position information from the one or more memories only in response to receiving updated satellite vehicle position information from the network entity via the one or more communication receivers.

Clause 4. The UE of clause 1, wherein a batch report includes the first position estimate, the first indication, the second indication, and the third indication, and wherein the one or more processors are configured to:

determine second estimated locations of a second plurality of satellite vehicles, different from the first plurality of satellite vehicles, based on second satellite vehicle position information that has exceeded a second expiration time of the second satellite vehicle position information;

determine a second position estimate based on the second estimated locations of the second plurality of satellite vehicles, and second measurements of second satellite vehicle signals received by the one or more satellite positioning system receivers; and transmit, via the one or more transmitters in the batch report, the second position estimate, a fourth indication of the second plurality of satellite vehicles from which signals were used to determine the second position estimate, a fifth indication of the second satellite vehicle position information used to determine the second position estimate, and a sixth indication of a second time corresponding to the second position estimate.

Clause 5. A position information provision method comprising:

determining, at a UE, first estimated locations of a first plurality of satellite vehicles based on first satellite vehicle position information that has exceeded a first expiration time of the first satellite vehicle position information;

determining, at the UE, a first position estimate based on the first estimated locations of the first plurality of satellite vehicles, and first measurements of first satellite vehicle signals received by the UE; and transmitting, from the UE to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate.

Clause 6. The position information provision method of clause 5, further comprising extrapolating, at the UE, satellite vehicle paths indicated by the first satellite vehicle position information to determine the first estimated locations of the first plurality of satellite vehicles.

Clause 7. The position information provision method of clause 5, further comprising:

receiving updated satellite vehicle position information at the UE from the network entity, wherein the first satellite vehicle position information is stale satellite vehicle position information; and removing the stale satellite vehicle position information from a memory of the UE only in response to receiving the updated satellite vehicle position information from the network entity.

Clause 8. The position information provision method of clause 5, wherein a batch report includes the first position estimate, the first indication, the second indication, and the third indication, and the position information provision method further comprises:

determining, at the UE, second estimated locations of a second plurality of satellite vehicles, different from the first plurality of satellite vehicles, based on second satellite vehicle position information that has exceeded a second expiration time of the second satellite vehicle position information;

determining, at the UE, a second position estimate based on the second estimated locations of the second plurality of satellite vehicles, and second measurements of second satellite vehicle signals received by the UE; and transmitting, from the UE to the network entity in the batch report, the second position estimate, a fourth indication of the second plurality of satellite vehicles from which signals were used to determine the second position estimate, a fifth indication of the second satellite vehicle position information used to determine the second position estimate, and a sixth indication of a second time corresponding to the second position estimate.

Clause 9. A UE comprising:

means for determining first estimated locations of a first plurality of satellite vehicles based on first satellite vehicle position information that has exceeded a first expiration time of the first satellite vehicle position information;

means for determining a first position estimate based on the first estimated locations of the first plurality of satellite vehicles, and first measurements of first satellite vehicle signals received by the UE; and means for transmitting, to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate.

Clause 10. The UE of clause 9, further comprising means for extrapolating satellite vehicle paths indicated by the first satellite vehicle position information to determine the first estimated locations of the first plurality of satellite vehicles.

Clause 11. The UE of clause 9, further comprising:

means for receiving signals from the network entity, wherein the first satellite vehicle position information is stale satellite vehicle position information; and means for removing the stale satellite vehicle position information from a memory of the UE only in response to receiving updated satellite vehicle position information from the network entity.

Clause 12. The UE of clause 9, wherein a batch report includes the first position estimate, the first indication, the second indication, and the third indication, and the UE further comprises:

means for determining second estimated locations of a second plurality of satellite vehicles, different from the first plurality of satellite vehicles, based on second satellite vehicle position information that has exceeded a second expiration time of the second satellite vehicle position information;

means for determining a second position estimate based on the second estimated locations of the second plurality of satellite vehicles, and second measurements of second satellite vehicle signals received by the UE; and means for transmitting, to the network entity in the batch report, the second position estimate, a fourth indication of the second plurality of satellite vehicles from which signals were used to determine the second position estimate, a fifth indication of the second satellite vehicle position information used to determine the second position estimate, and a sixth indication of a second time corresponding to the second position estimate.

Clause 13. A non-transitory, processor-readable storage medium comprising processor-readable instructions to cause one or more processors of a user equipment (UE) to:

determine first estimated locations of a first plurality of satellite vehicles based on first satellite vehicle position information that has exceeded a first expiration time of the first satellite vehicle position information;

determine a first position estimate based on the first estimated locations of the first plurality of satellite vehicles, and first measurements of first satellite vehicle signals received by the UE; and transmit, to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate.

Clause 14. The non-transitory, processor-readable storage medium of clause 12, further comprising processor-readable instructions to cause the one or more processors to extrapolate satellite vehicle paths indicated by the first satellite vehicle position information to determine the first estimated locations of the first plurality of satellite vehicles.

Clause 15. The non-transitory, processor-readable storage medium of clause 12, further comprising processor-readable instructions to cause the one or more processors to:

receive signals from the network entity, wherein the first satellite vehicle position information is stale satellite vehicle position information; and remove the stale satellite vehicle position information from a memory of the UE only in response to receiving updated satellite vehicle position information from the network entity.

Clause 16. The non-transitory, processor-readable storage medium of clause 12, wherein a batch report includes the first position estimate, the first indication, the second indication, and the third indication, and the non-transitory, processor-readable storage medium further comprises processor-readable instructions to cause the one or more processors to:

determine second estimated locations of a second plurality of satellite vehicles, different from the first plurality of satellite vehicles, based on second satellite vehicle position information that has exceeded a second expiration time of the second satellite vehicle position information;

determine a second position estimate based on the second estimated locations of the second plurality of satellite vehicles, and second measurements of second satellite vehicle signals received by the UE; and transmit, to the network entity in the batch report, the second position estimate, a fourth indication of the second plurality of satellite vehicles from which signals were used to determine the second position estimate, a fifth indication of the second satellite vehicle position information used to determine the second position estimate, and a sixth indication of a second time corresponding to the second position estimate.

Clause 17. A network entity comprising:

one or more memories;

one or more receivers; and one or more processors communicatively coupled to the one or more memories and the one or more receivers and configured to:

receive, via the one or more receivers from a user equipment, a first reported position estimate, a first indication of first satellite vehicles from which signals were used to determine the first reported position estimate, a second indication of first stale satellite vehicle position information used to determine the first reported position estimate, and a third indication of a first time corresponding to the first reported position estimate, wherein the first stale satellite vehicle position information exceeded a first expiration time of the first stale satellite vehicle position information as of the first time corresponding to the first reported position estimate; and determine first pseudoranges based on the first reported position estimate, the first indication of first satellite vehicles, the second indication of the first stale satellite vehicle position information, and the third indication of the first time corresponding to the first reported position estimate.

Clause 18. The network entity of clause 17, wherein the one or more processors are configured to determine an updated position estimate for the user equipment based on the first pseudoranges and first fresh satellite vehicle position information corresponding to the first satellite vehicles indicated by the first indication, wherein a second expiration time of the fresh satellite vehicle position information is no earlier than the first time corresponding to the first reported position estimate.

Clause 19. The network entity of clause 17, wherein the one or more processors are configured to:

receive, via the one or more receivers from the user equipment, a second reported position estimate, a fourth indication of second satellite vehicles from which signals were used to determine the second reported position estimate, a fifth indication of second stale satellite vehicle position information used to determine the second reported position estimate, and a sixth indication of a second time corresponding to the second reported position estimate, wherein the second stale satellite vehicle position information exceeded a second expiration time of the second stale satellite vehicle position information as of the second time corresponding to the second reported position estimate;

determine second pseudoranges based on the first reported position estimate, the fourth indication of second satellite vehicles, the fifth indication of the second stale satellite vehicle position information, and the sixth indication of the second time corresponding to the second reported position estimate; and determine an updated position estimate for the user equipment based on the first pseudoranges, the second pseudoranges, and fresh satellite vehicle position information corresponding to the first satellite vehicles indicated by the first indication and the second satellite vehicles indicated by the fourth indication, wherein a third expiration time of the fresh satellite vehicle position information is no earlier than the first time corresponding to the first reported position estimate or the second time corresponding to the second reported position estimate.

Clause 20. A position information determination method comprising:

receiving, at a network entity from a user equipment, a first reported position estimate, a first indication of first satellite vehicles from which signals were used to determine the first reported position estimate, a second indication of first stale satellite vehicle position information used to determine the first reported position estimate, and a third indication of a first time corresponding to the first reported position estimate, wherein the first stale satellite vehicle position information exceeded a first expiration time of the first stale satellite vehicle position information as of the first time corresponding to the first reported position estimate; and determining, at the network entity, first pseudoranges based on the first reported position estimate, the first indication of first satellite vehicles, the second indication of the first stale satellite vehicle position information, and the third indication of the first time corresponding to the first reported position estimate.

Clause 21. The position information determination method of clause 20, further comprising determining, at the network entity, an updated position estimate for the user equipment based on the first pseudoranges and first fresh satellite vehicle position information corresponding to the first satellite vehicles indicated by the first indication, wherein a second expiration time of the fresh satellite vehicle position information is no earlier than the first time corresponding to the first reported position estimate.

Clause 22. The position information determination method of clause 20, further comprising:

receiving, at the network entity from the user equipment, a second reported position estimate, a fourth indication of second satellite vehicles from which signals were used to determine the second reported position estimate, a fifth indication of second stale satellite vehicle position information used to determine the second reported position estimate, and a sixth indication of a second time corresponding to the second reported position estimate, wherein the second stale satellite vehicle position information exceeded a second expiration time of the second stale satellite vehicle position information as of the second time corresponding to the second reported position estimate;

determining, at the network entity, second pseudoranges based on the first reported position estimate, the fourth indication of second satellite vehicles, the fifth indication of the second stale satellite vehicle position information, and the sixth indication of the second time corresponding to the second reported position estimate; and determining, at the network entity, an updated position estimate for the user equipment based on the first pseudoranges, the second pseudoranges, and fresh satellite vehicle position information corresponding to the first satellite vehicles indicated by the first indication and the second satellite vehicles indicated by the fourth indication, wherein a third expiration time of the fresh satellite vehicle position information is no earlier than the first time corresponding to the first reported position estimate or the second time corresponding to the second reported position estimate.

Clause 23. A network entity comprising:

means for receiving, from a user equipment, a first reported position estimate, a first indication of first satellite vehicles from which signals were used to determine the first reported position estimate, a second indication of first stale satellite vehicle position information used to determine the first reported position estimate, and a third indication of a first time corresponding to the first reported position estimate, wherein the first stale satellite vehicle position information exceeded a first expiration time of the first stale satellite vehicle position information as of the first time corresponding to the first reported position estimate; and means for determining first pseudoranges based on the first reported position estimate, the first indication of first satellite vehicles, the second indication of the first stale satellite vehicle position information, and the third indication of the first time corresponding to the first reported position estimate.

Clause 24. The network entity of clause 23, further comprising means for determining an updated position estimate for the user equipment based on the first pseudoranges and first fresh satellite vehicle position information corresponding to the first satellite vehicles indicated by the first indication, wherein a second expiration time of the fresh satellite vehicle position information is no earlier than the first time corresponding to the first reported position estimate.

Clause 25. The network entity of clause 23, further comprising:

means for receiving, from the user equipment, a second reported position estimate, a fourth indication of second satellite vehicles from which signals were used to determine the second reported position estimate, a fifth indication of second stale satellite vehicle position information used to determine the second reported position estimate, and a sixth indication of a second time corresponding to the second reported position estimate, wherein the second stale satellite vehicle position information exceeded a second expiration time of the second stale satellite vehicle position information as of the second time corresponding to the second reported position estimate;

means for determining second pseudoranges based on the first reported position estimate, the fourth indication of second satellite vehicles, the fifth indication of the second stale satellite vehicle position information, and the sixth indication of the second time corresponding to the second reported position estimate; and means for determining an updated position estimate for the user equipment based on the first pseudoranges, the second pseudoranges, and fresh satellite vehicle position information corresponding to the first satellite vehicles indicated by the first indication and the second satellite vehicles indicated by the fourth indication, wherein a third expiration time of the fresh satellite vehicle position information is no earlier than the first time corresponding to the first reported position estimate or the second time corresponding to the second reported position estimate.

Clause 26. A non-transitory, processor-readable storage medium comprising processor-readable instructions to cause one or more processors of a network entity to:

receive, from a user equipment, a first reported position estimate, a first indication of first satellite vehicles from which signals were used to determine the first reported position estimate, a second indication of first stale satellite vehicle position information used to determine the first reported position estimate, and a third indication of a first time corresponding to the first reported position estimate, wherein the first stale satellite vehicle position information exceeded a first expiration time of the first stale satellite vehicle position information as of the first time corresponding to the first reported position estimate; and determine first pseudoranges based on the first reported position estimate, the first indication of first satellite vehicles, the second indication of the first stale satellite vehicle position information, and the third indication of the first time corresponding to the first reported position estimate.

Clause 27. The non-transitory, processor-readable storage medium of clause 26, further comprising processor-readable instructions to cause the one or more processors to determine an updated position estimate for the user equipment based on the first pseudoranges and first fresh satellite vehicle position information corresponding to the first satellite vehicles indicated by the first indication, wherein a second expiration time of the fresh satellite vehicle position information is no earlier than the first time corresponding to the first reported position estimate.

Clause 28. The non-transitory, processor-readable storage medium of clause 26, further comprising processor-readable instructions to cause the one or more processors to:

receive, from the user equipment, a second reported position estimate, a fourth indication of second satellite vehicles from which signals were used to determine the second reported position estimate, a fifth indication of second stale satellite vehicle position information used to determine the second reported position estimate, and a sixth indication of a second time corresponding to the second reported position estimate, wherein the second stale satellite vehicle position information exceeded a second expiration time of the second stale satellite vehicle position information as of the second time corresponding to the second reported position estimate;

determine second pseudoranges based on the first reported position estimate, the fourth indication of second satellite vehicles, the fifth indication of the second stale satellite vehicle position information, and the sixth indication of the second time corresponding to the second reported position estimate; and determine an updated position estimate for the user equipment based on the first pseudoranges, the second pseudoranges, and fresh satellite vehicle position information corresponding to the first satellite vehicles indicated by the first indication and the second satellite vehicles indicated by the fourth indication, wherein a third expiration time of the fresh satellite vehicle position information is no earlier than the first time corresponding to the first reported position estimate or the second time corresponding to the second reported position estimate.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A UE (user equipment) comprising:
one or more memories;
one or more satellite positioning system receivers;
one or more transmitters; and
one or more processors communicatively coupled to the one or more memories, the one or more satellite positioning system receivers, and the one or more transmitters, and configured to:
  determine first estimated locations of a first plurality of satellite vehicles based on first satellite vehicle position information that has exceeded a first expiration time of the first satellite vehicle position information;
  determine a first position estimate based on the first estimated locations of the first plurality of satellite vehicles, and first measurements of first satellite vehicle signals received by the one or more satellite positioning system receivers; and
  transmit, via the one or more transmitters to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate;
  wherein the one or more processors are configured to extrapolate satellite vehicle paths indicated by the first satellite vehicle position information to determine the first estimated locations of the first plurality of satellite vehicles.

2. The UE of claim 1, further comprising one or more communication receivers communicatively coupled to the one or more processors and configured to receive signals from the network entity, wherein the first satellite vehicle position information is stale satellite vehicle position information, and wherein the one or more processors are configured to remove the stale satellite vehicle position information from the one or more memories only in response to receiving updated satellite vehicle position information from the network entity via the one or more communication receivers.

3. The UE of claim 1, wherein a batch report includes the first position estimate, the first indication, the second indication, and the third indication, and wherein the one or more processors are configured to:
  determine second estimated locations of a second plurality of satellite vehicles, different from the first plurality of satellite vehicles, based on second satellite vehicle position information that has exceeded a second expiration time of the second satellite vehicle position information;
  determine a second position estimate based on the second estimated locations of the second plurality of satellite vehicles, and second measurements of second satellite vehicle signals received by the one or more satellite positioning system receivers; and
  transmit, via the one or more transmitters in the batch report, the second position estimate, a fourth indication of the second plurality of satellite vehicles from which signals were used to determine the second position estimate, a fifth indication of the second satellite vehicle position information used to determine the second position estimate, and a sixth indication of a second time corresponding to the second position estimate.

4. A position information provision method comprising:
determining, at a user equipment (UE), first estimated locations of a first plurality of satellite vehicles based on first satellite vehicle position information that has exceeded a first expiration time of the first satellite vehicle position information;
determining, at the UE, a first position estimate based on the first estimated locations of the first plurality of satellite vehicles, and first measurements of first satellite vehicle signals received by the UE; and
transmitting, from the UE to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate;
wherein determining the first estimated locations of the first plurality of satellite vehicles comprises extrapolating, at the UE, satellite vehicle paths indicated by the first satellite vehicle position information.

5. The position information provision method of claim 4, further comprising:
receiving updated satellite vehicle position information at the UE from the network entity, wherein the first satellite vehicle position information is stale satellite vehicle position information; and
removing the stale satellite vehicle position information from a memory of the UE only in response to receiving the updated satellite vehicle position information from the network entity.

6. The position information provision method of claim 4, wherein a batch report includes the first position estimate, the first indication, the second indication, and the third indication, and the position information provision method further comprises:
determining, at the UE, second estimated locations of a second plurality of satellite vehicles, different from the first plurality of satellite vehicles, based on second satellite vehicle position information that has exceeded a second expiration time of the second satellite vehicle position information;

determining, at the UE, a second position estimate based on the second estimated locations of the second plurality of satellite vehicles, and second measurements of second satellite vehicle signals received by the UE; and transmitting, from the UE to the network entity in the batch report, the second position estimate, a fourth indication of the second plurality of satellite vehicles from which signals were used to determine the second position estimate, a fifth indication of the second satellite vehicle position information used to determine the second position estimate, and a sixth indication of a second time corresponding to the second position estimate.

7. A user equipment (UE) comprising:

means for determining first estimated locations of a first plurality of satellite vehicles based on first satellite vehicle position information that has exceeded a first expiration time of the first satellite vehicle position information;

means for determining a first position estimate based on the first estimated locations of the first plurality of satellite vehicles, and first measurements of first satellite vehicle signals received by the UE; and means for transmitting, to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate;

wherein the means for determining the first estimated locations of the first plurality of satellite vehicles comprises means for extrapolating satellite vehicle paths indicated by the first satellite vehicle position information.

8. The UE of claim 7, further comprising:

means for receiving signals from the network entity, wherein the first satellite vehicle position information is stale satellite vehicle position information; and means for removing the stale satellite vehicle position information from a memory of the UE only in response to receiving updated satellite vehicle position information from the network entity.

9. The UE of claim 7, wherein a batch report includes the first position estimate, the first indication, the second indication, and the third indication, and the UE further comprises:

means for determining second estimated locations of a second plurality of satellite vehicles, different from the first plurality of satellite vehicles, based on second satellite vehicle position information that has exceeded a second expiration time of the second satellite vehicle position information;

means for determining a second position estimate based on the second estimated locations of the second plurality of satellite vehicles, and second measurements of second satellite vehicle signals received by the UE; and means for transmitting, to the network entity in the batch report, the second position estimate, a fourth indication of the second plurality of satellite vehicles from which signals were used to determine the second position estimate, a fifth indication of the second satellite vehicle position information used to determine the second position estimate, and a sixth indication of a second time corresponding to the second position estimate.

10. A non-transitory, processor-readable storage medium comprising processor-readable instructions to cause one or more processors of a user equipment (UE) to:

determine first estimated locations of a first plurality of satellite vehicles based on first satellite vehicle position information that has exceeded a first expiration time of the first satellite vehicle position information;

determine a first position estimate based on the first estimated locations of the first plurality of satellite vehicles, and first measurements of first satellite vehicle signals received by the UE; and transmit, to a network entity, the first position estimate, a first indication of the first plurality of satellite vehicles from which signals were used to determine the first position estimate, a second indication of the first satellite vehicle position information used to determine the first position estimate, and a third indication of a first time corresponding to the first position estimate;

wherein the processor-readable instructions to cause the one or more processors to determine the first estimated locations of the first plurality of satellite vehicles comprise processor-readable instructions to cause the one or more processors to extrapolate satellite vehicle paths indicated by the first satellite vehicle position information.

11. The non-transitory, processor-readable storage medium of claim 10, further comprising processor-readable instructions to cause the one or more processors to:

receive signals from the network entity, wherein the first satellite vehicle position information is stale satellite vehicle position information; and remove the stale satellite vehicle position information from a memory of the UE only in response to receiving updated satellite vehicle position information from the network entity.

12. The non-transitory, processor-readable storage medium of claim 10, wherein a batch report includes the first position estimate, the first indication, the second indication, and the third indication, and the non-transitory, processor-readable storage medium further comprises processor-readable instructions to cause the one or more processors to:

determine second estimated locations of a second plurality of satellite vehicles, different from the first plurality of satellite vehicles, based on second satellite vehicle position information that has exceeded a second expiration time of the second satellite vehicle position information;

determine a second position estimate based on the second estimated locations of the second plurality of satellite vehicles, and second measurements of second satellite vehicle signals received by the UE; and transmit, to the network entity in the batch report, the second position estimate, a fourth indication of the second plurality of satellite vehicles from which signals were used to determine the second position estimate, a fifth indication of the second satellite vehicle position information used to determine the second position estimate, and a sixth indication of a second time corresponding to the second position estimate.

* * * * *